United States Patent [19]
Hagersten et al.

[11] Patent Number: 5,778,427
[45] Date of Patent: Jul. 7, 1998

[54] METHOD AND APPARATUS FOR SELECTING A WAY OF A MULTI-WAY ASSOCIATIVE CACHE BY STORING WAYLETS IN A TRANSLATION STRUCTURE

[75] Inventors: Erik Hagersten, Palo Alto; Ashok Singhal, Redwood City, both of Calif.

[73] Assignee: Sun Microsystems, Inc., Palo Alto, Calif.

[21] Appl. No.: 499,590

[22] Filed: Jul. 7, 1995

[51] Int. Cl.$^6$ .................................................. G06F 12/08
[52] U.S. Cl. .................................................. 711/128
[58] Field of Search .................... 395/403, 414, 395/415, 416, 417, 455; 711/128, 144

[56] References Cited

U.S. PATENT DOCUMENTS

| | | | |
|---|---|---|---|
| 5,055,999 | 10/1991 | Frank et al. | 711/163 |
| 5,235,697 | 8/1993 | Steely, Jr. | 711/137 |
| 5,297,265 | 3/1994 | Frank et al. | 711/202 |
| 5,341,483 | 8/1994 | Frank et al. | 711/206 |
| 5,369,753 | 11/1994 | Tipley | 711/122 |
| 5,418,922 | 5/1995 | Liu | 711/3 |
| 5,640,532 | 6/1997 | Thome et al. | 711/128 |

OTHER PUBLICATIONS

"Computer Architecture A Quantitative Approach", by John L. Hennessy and David A. Patterson, Chapter 8, pp. 403–490, QA76.9A73P377, 1990.
"Decoupled Sector Caches: conciliating low tag implementation cost and low miss ratio", by Andre Seznec, IRISA, Campus de Beaulieu, France, 21th International Symposium on Computer Architecture, Apr. 1994, (11 pages).
"Cache Memories", by Alan Jay Smith, University of California, Berkeley, Computing Surveys, vol. 14, No. 3, Sep. 1982, pp. 474–530, 1982 ACM 0010–4892/82/0900–0473.
"Cache Design of A Sub–Micron CMOS System/370", J.H. Chang, H. Chao, and K.So, IBM T.J. Watson Research, 1987 ACM0084–7495/87/0600–0208, pp. 208–213.
"A Case for Direct–Mapped Caches", by Mark D. Hill, University of Wisconsin, IEEE Computer vol. 21, No. 12, Dec. 1988, pp. 25–40.

Hagersten, Erik, "Simple COMA Node Implementations," HICSS, Jan. 1994, pp. 1–12.

*Primary Examiner*—Eddie P. Chan
*Assistant Examiner*—Kevin Verbrugge
*Attorney, Agent, or Firm*—Conley, Rose & Tayon; B. Noel Kivlin

[57] ABSTRACT

The present invention provides a cache manager (CM) for use with an address translation table (ATT) which take advantage of way information, available when a cache line is first cached, for efficiently accessing a multi-way cache of a computer system having a main memory and one or more processors. The main memory and the ATT are page-oriented while the cache is organized using cache lines. The cache includes a plurality of cache lines divided into a number of segments corresponding to the number of "ways". Each cache line includes an address tag (AT) field and a data field. The way information is stored in the ATT for later cache access. In this implementation, "waylets" provide an efficiency mechanism for storing the way information whenever a cache line is cached. Accordingly, each table entry of the ATT includes a virtual address (VA) field, a physical address (PA) field, and a plurality of waylets associated with each pair of VA and PA fields. Subsequently, the waylets can be used to quickly index directly into a single segment of the cache as follows. Upon receiving a virtual address of a target cache line, the CM attempts to match a virtual address field of one of the ATT entries with a page index portion of the virtual address. If there is a match, a waylet of the ATT entry is retrieved using a page offset portion of the virtual address. If the waylet value is valid, the CM indexes directly into a single cache line using the waylet value, the physical address field of the ATT entry and the page offset portion of the virtual address. If the AT field of the retrieved cache line matches with a portion of the physical address field of the ATT entry, the processor retrieves the data field of the cache line using the page offset portion of the VA. If the AT field does not match, the target cache line is retrieved from the main memory, and the waylet value in both the ATT and the main memory is updated.

30 Claims, 11 Drawing Sheets

METHOD AND APPARATUS FOR SELECTING A WAY OF A MULTI-WAY ASSOCIATIVE CACHE BY STORING WAYLETS IN A TRANSLATION STRUCTURE

BACKGROUND OF THE INVENTION

1. Field of the Invention

The present invention relates to the field of memory caches. More particularly, the invention relates to efficient cache tagging schemes.

2. Description of the Related Art

FIG. 1 is a block diagram of a uni-processor computer system 100 including a processor 110, a system interconnect 120, a main memory 130, a mass storage device 140, a monitor 160 and a keyboard/mouse 170. In a conventional computer system such as computer system 100, prior to program execution, instructions and data structures of a program are loaded from mass storage device 140, typically a hard disk drive, into main memory 130, typically cheap but slow dynamic random access memory (DRAM). Subsequently, during program execution, processor 110 accesses the instructions and data stored in main memory 130 as needed via system interconnect 120.

As the instruction/data processing capability of processor 110 increases, instead of being processor-bound, the instruction/data processing capability of computer system 100 becomes memory bound. This is partly because technical advances which have increased the access speed of main memory 130 have not kept up with the advances which have increased the internal instruction/data processing capability of processor 110. As a result, the efficiency of processor 110 is hampered by the rate at which data and instructions can be transferred between main memory 130 and processor 110 via system interconnect 120.

The same memory bottleneck also exists for multi-processor systems. FIG. 2 is a block diagram of one such multi-processor computer system 200 having a plurality of processors 211, 212, . . . 219 coupled to each other and to a main memory 130 and a mass storage device 140 via a common system interconnect 120.

One partial solution to the memory bottlenecks of systems 100, 200 is the introduction of a smaller, faster but more expensive cache, typically static random access memory (SRAM), coupled directly to the respective processors. As shown in FIGS. 1 and 2, each processor is associated with a cache. For example, processor 211 is coupled to cache 251. Depending on the implementation, caches 150, 251, 252, . . . 259 may also be coupled directly to system interconnect 120.

FIG. 3A shows an exemplary implementation of a conventional associative cache 310a having C cache lines. Each cache line includes two fields, an address tag ("AT") field and a data field associatively coupled to the AT field. In this scheme, the physical address of each cache line has corresponding AT and index portions. Cache 300a is illustrative of cache 150 or any one of caches 251, 242, . . . 259.

A processor, e.g., processor 110, accesses a target cache line, e.g., the nth cache line, by using the index portion of the physical address (PA) as an offset relative to the top of cache 310a to locate the target cache line. Next, the AT portion of the cache line physical address is compared with the content of the AT field of the target cache line. If there is a match between the respective AT values, there is a "cache hit", and the data field of the target cache line is provided to processor 110.

In order to increase the probability of a cache hit, the cache can be expanded with increased associativity. Referring now to the block diagram of FIG. 3B, a two-way associative cache 310b has C cache rows. Each cache row includes a pair of cache lines comprising AT and data fields, with each data field associatively coupled to the respective AT field, thereby increasing the cache hit probability. Cache 300b also includes comparators 311, 312 and a multiplexer (MUX) 313. Cache 310b can be any one of caches 150,251, 242, . . . 259. The operation of two-way associative cache 310b is as follows.

When a processor, e.g., processor 211, uses a physical address to access cache 310b, the cache index portion of the address is used as an offset to locate a pair of target cache lines. In this implementation, both indexed AT fields of the target cache lines are retrieved and compared with the AT portion of the physical address by comparators 311, 312. If there is a cache hit with either one of the target cache lines, the appropriate data field is selected by MUX 313 under the control of comparators 311, 312, and the selected data field provided to the requesting processor 211. Depending on the specific implementation, the lower bits of the physical byte address may be used to extract a byte of interest within the target cache line, thereby reducing the bit width of MUX 313.

Hence, caches 150, 251, 252, . . . 259 function as high speed depositories between main memory 130 and processors 110,211,212, . . . 219, respectively, by taking advantage of the temporal spatial locality in the average access pattern of the processors. The spatial locality is exploited whenever a cache fetches data adjacent to the requested data during one access to a cache line. Hence, when caches 150, 251, 252, . . . 259 are used in combination with techniques such as instruction fetch prediction for pre-fetching instructions/data that are likely to be used and retaining instructions/data likely to be reused, the above-described memory bottlenecks of computer systems 100, 200 are partially alleviated.

FIG. 4 shows an exemplary prior art TLB 420, a virtual address 430 and a corresponding physical address 440 for accessing a 7-way associative cache 410. TLB 420 can be anyone of TLBs 110a, 211a, 212a, . . . 219a. Typically, main memory 130 and TLB 420 are page-oriented while cache 410 is organized using cache lines. In a fully-associative implementation of TLB 420, a "TLB-lookup" is executed in the following manner.

First a processor, e.g. processor 211, compares the respective virtual address (VA) fields of every entry in TLB 420 with the page index portion of VA 430. In this example shown in FIG. 4, if there is a hit, e.g. with TLB entry 420a, a 8-bit portion of the PA value of TLB entry 420a is combined with a 7-bit page offset portion of VA 430 to form a 15-bit index into for accessing every segment of cache 410.

Unfortunately, even after a TLB entry hit, processor 211 still has no knowledge of which of the seven segments 411, 412,413, . . . 417 of cache 410 might contain the target cache line. This is because way information, i.e., segment identification, corresponding to the target cache line was previously discarded by processor 211 when the target cache line was first cached, and further since there is no mechanism in conventional TLB 420 for storing or for using way information.

Consequently, a second set of seven comparisons has to be made between the respective AT fields of the retrieved cache lines 411a, 412a, 413a, . . . 417a and the remaining portion of the PA value from the TLB entry 420a by the respective comparators 451, 452, ... 457 in an attempt to locate the target cache line. If there is match, i.e., a cache hit, the data field of the matching cache line is retrieved and presented to processor 211.

Hence, a major disadvantage of the conventional "TLB-lookup" scheme is the requirement for processor 211 to perform two distinct levels of comparisons. Further, the second level of multiple comparisons cannot begin until the first level of comparisons is completed.

One way to increase the speed of comparators 451, 452, 453, ... 457 is to physically locate comparators 451,452, 453, ... 457 and every AT field of cache 410 onto the same IC as the processor. However, such a location substantially increases in the size of processor IC and compromises the production yield of the processor.

Hence there is a need for an efficient cache tagging scheme, suitable for both uni-processor and multi-processor computer systems, that takes advantage of the way information to execute fast and efficient retrievals of cached information, and is implementable in a compact form without a massive increase in the size of the processor.

SUMMARY OF THE INVENTION

The present invention provides a cache manager (CM) for use with an address translation table (ATT) which take advantage of way information, available when a cache line is first cached, for efficiently accessing a multi-way cache of a computer system having a main memory and one or more processors. The main memory and the ATT are page-oriented while the cache is organized using cache lines. The CM tracks the contents of the multi-way cache via the ATT. The cache includes a plurality of cache lines divided into a number of segments corresponding to the number of "ways". Each cache line includes an address tag (AT) field and a data field.

In accordance with the present invention, instead of discarding useful way information available when a cache line is first cached, the way information is stored in the ATT for later cache access. In this implementation, "waylets" provide an efficient mechanism for storing the way information whenever a cache line is cached. Accordingly, each table entry of the ATT includes a virtual address (VA) field, a physical address (PA) field, and a plurality of waylets associated with each pair of VA and PA fields. Other means for storing the way information are possible. Subsequently, the waylets can be used to quickly index directly into a single segment of the cache instead of having to access each and every segment of the cache.

The number of bits in each waylet is dependent on the number of "ways". One waylet value is reserved for an invalid value. In this implementation, the number of waylet bit(s) is equal to the log base 2 of the number of way(s) plus one ($\log_2$(way+1)). For example, a one-bit waylet is needed for a one-way cache, and a two-bit waylet is needed for a two-way cache or a three-way cache.

Access of the cache via the ATT by the CM is as follows. Upon receiving a virtual address of a target cache line, the CM attempts to match a virtual address field of one of the ATT entries with a page index portion of the virtual address. If there is a match, a waylet of the ATT entry is retrieved using a page offset portion of the virtual address. If the waylet value is valid, the CM indexes directly into a single cache line using the waylet value, the physical address field of the ATT entry and the page offset portion of the virtual address.

An attempt is then made to match the AT field of the retrieved cache line with a portion of the physical address field of the ATT entry, i.e., a "sanity" check. If the AT field matches, the processor retrieves the data field of the cache line using the page offset portion of the VA. If the AT field does not match, the target cache line is retrieved from the main memory, and the waylet value in both the ATT and the main memory updated. In the event that there is no available cache line, i.e., the seven corresponding "ways" are occupied, an old cache line is selected for replacement. In this implementation, "dirty", i.e., modified, cache lines are written back to main memory when they are purged from the cache.

Conversely, if these is no match between the virtual address field of one of the ATT entries and a page index portion of the virtual address, then an attempt is made to retrieve the ATT entry from the main memory. Upon fetching the ATT entry from main memory, the cache is accessed as described above. However, if the ATT entry does not exist in main memory, i.e. a page fault, then a new ATT entry needs to be created.

In sum, waylets advantageously provide an efficient and compact mechanism for indexing directly into a single cache line, thereby greatly reducing a second level of comparisons of multiple AT values to a single "sanity" check, regardless of the number of segments in the cache. Pre-fetching of data from the indexed cache line is now possible, further streamlining the retrieval process and increasing the cache access speed substantially. In addition, the compact ATT can be fabricated as part of the processor IC without substantially decreasing the yield of the processor.

DESCRIPTION OF THE DRAWINGS

The objects, features and advantages of the system of the present invention will be apparent from the following description in which.

DESCRIPTION OF THE PREFERRED EMBODIMENT

In the following description, numerous details provide a thorough understanding of the invention. These details include functional blocks and an exemplary address translation table (ATT) to assist a designer in implementing an efficient cache tagging scheme. In addition, while the cache tagging scheme of the present invention is described with reference to specific caches and computer architectures, the invention is applicable to a wide range of memory and system architectures. In other instances, well-known circuits and structures are not described in detail so as not to obscure the invention unnecessarily.

Figure 1:
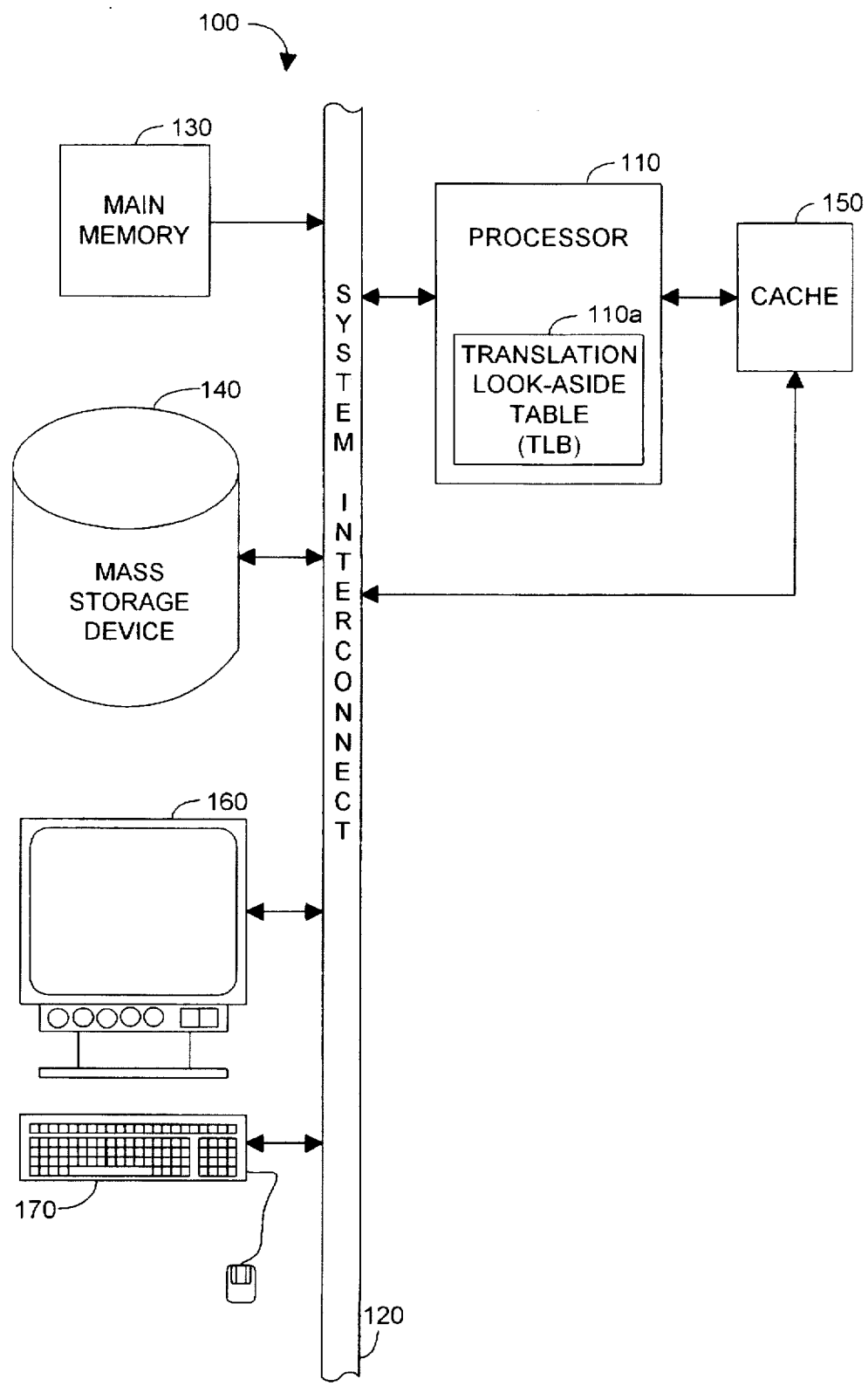
FIG. 1 is a block diagram of a uni-processor computer system.
Figure 2:
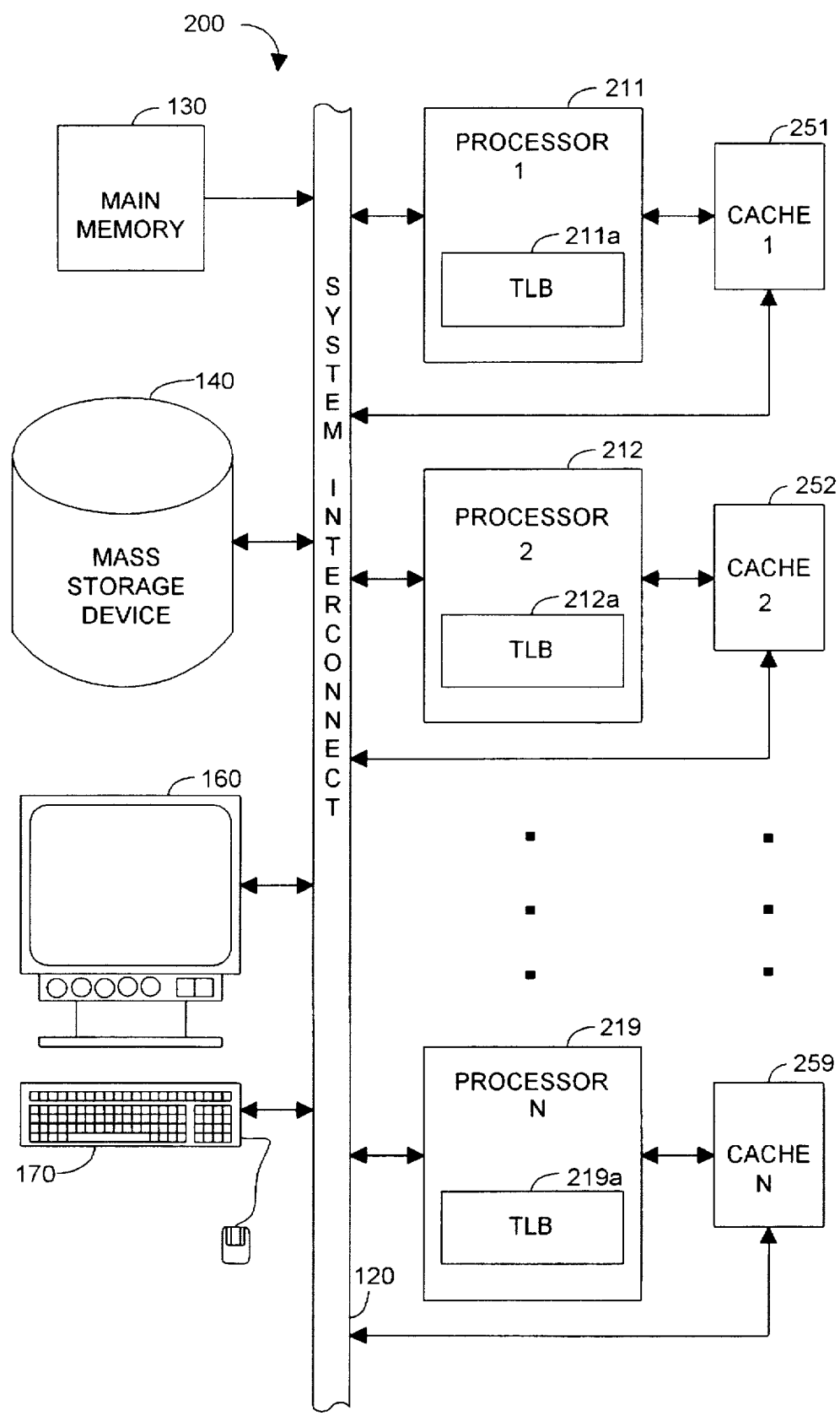
FIG. 2 is a block diagram of a multi-processor computer system.
Figure 3A:
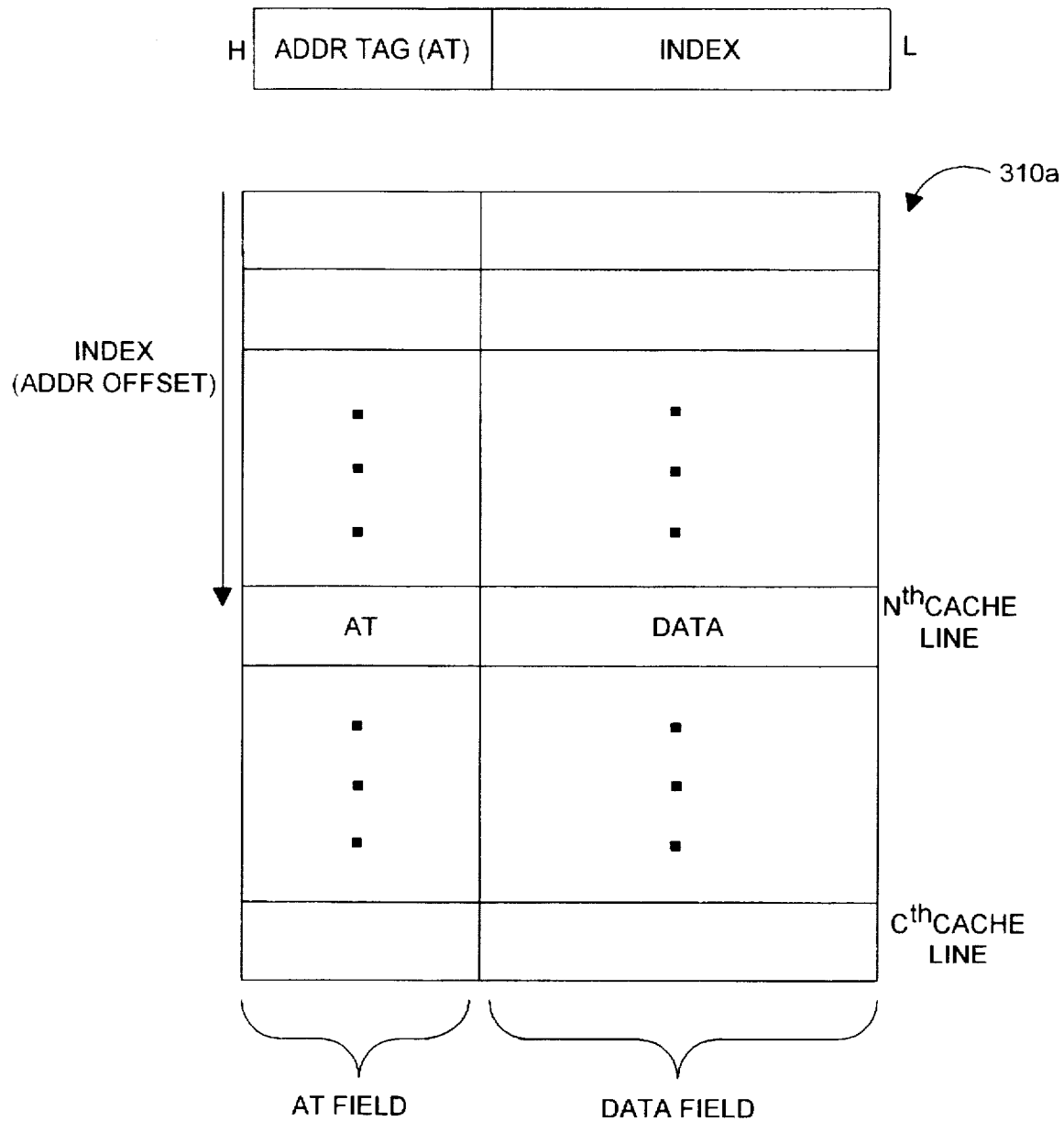
FIG. 3A is a block diagram illustrating a one-way cache.
Figure 3B:
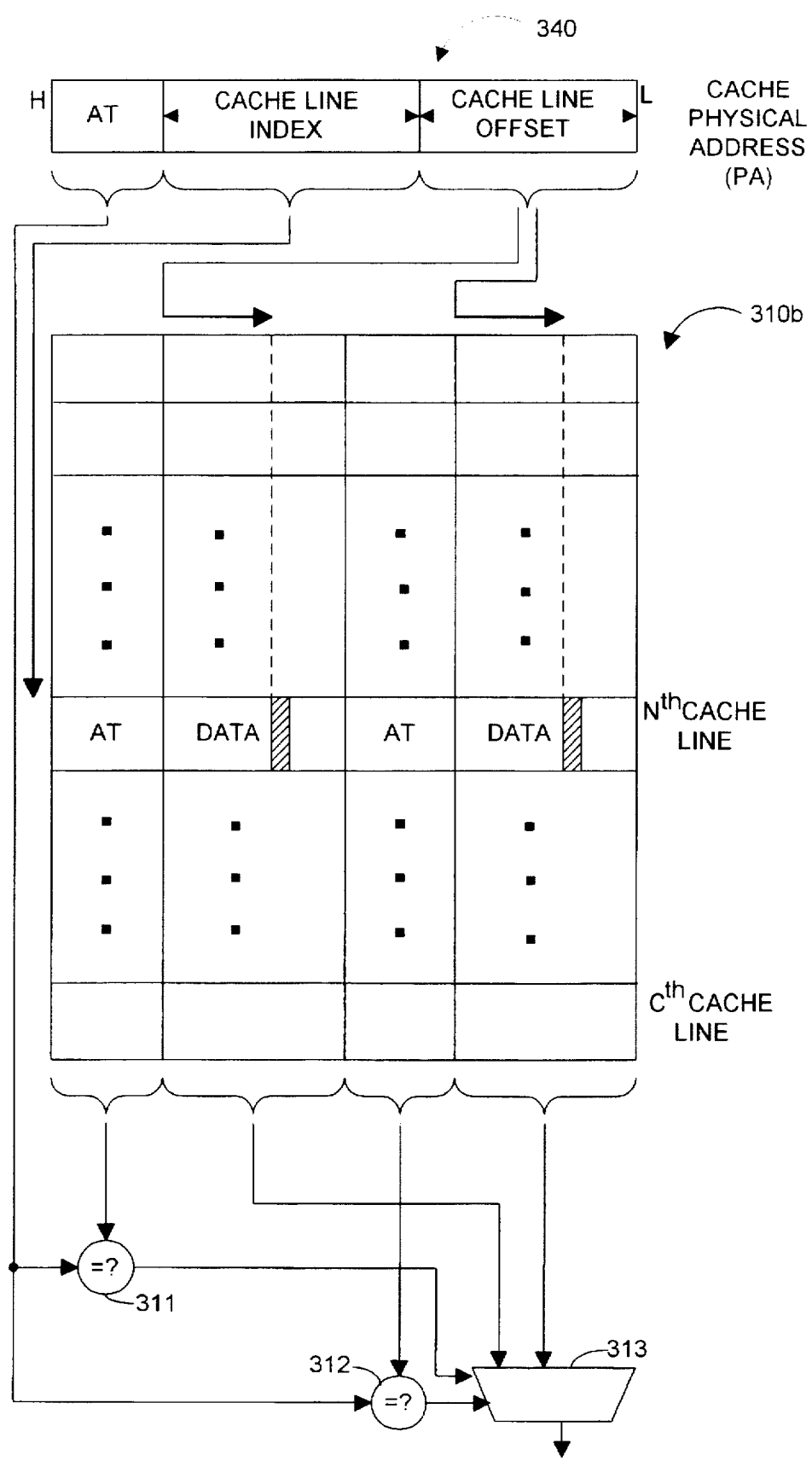
FIG. 3B illustrates a retrieval of data from a two-way cache.
Figure 4:
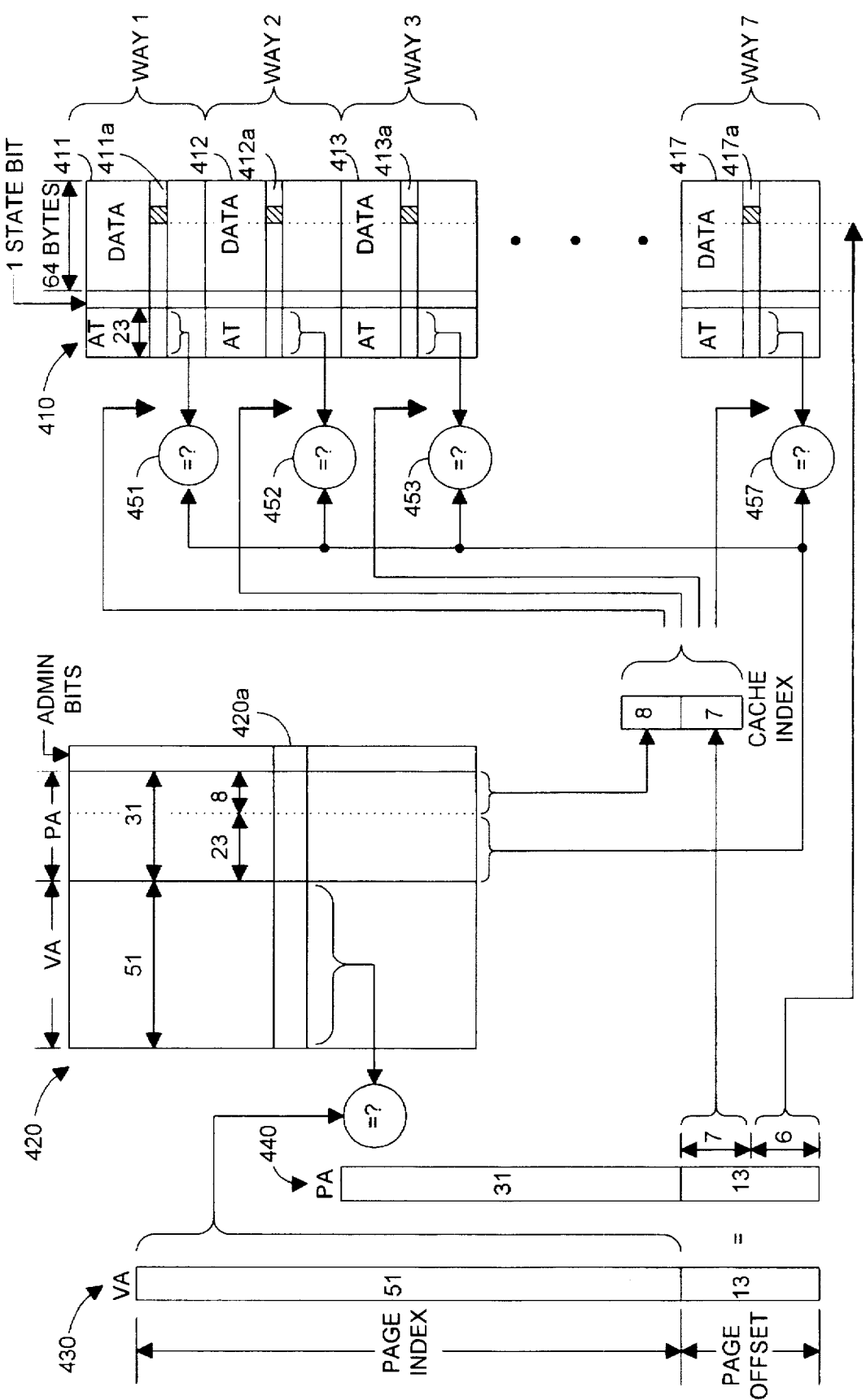
FIG. 4 illustrates a retrieval of data from a seven-way cache using a virtual address.
Figure 5:
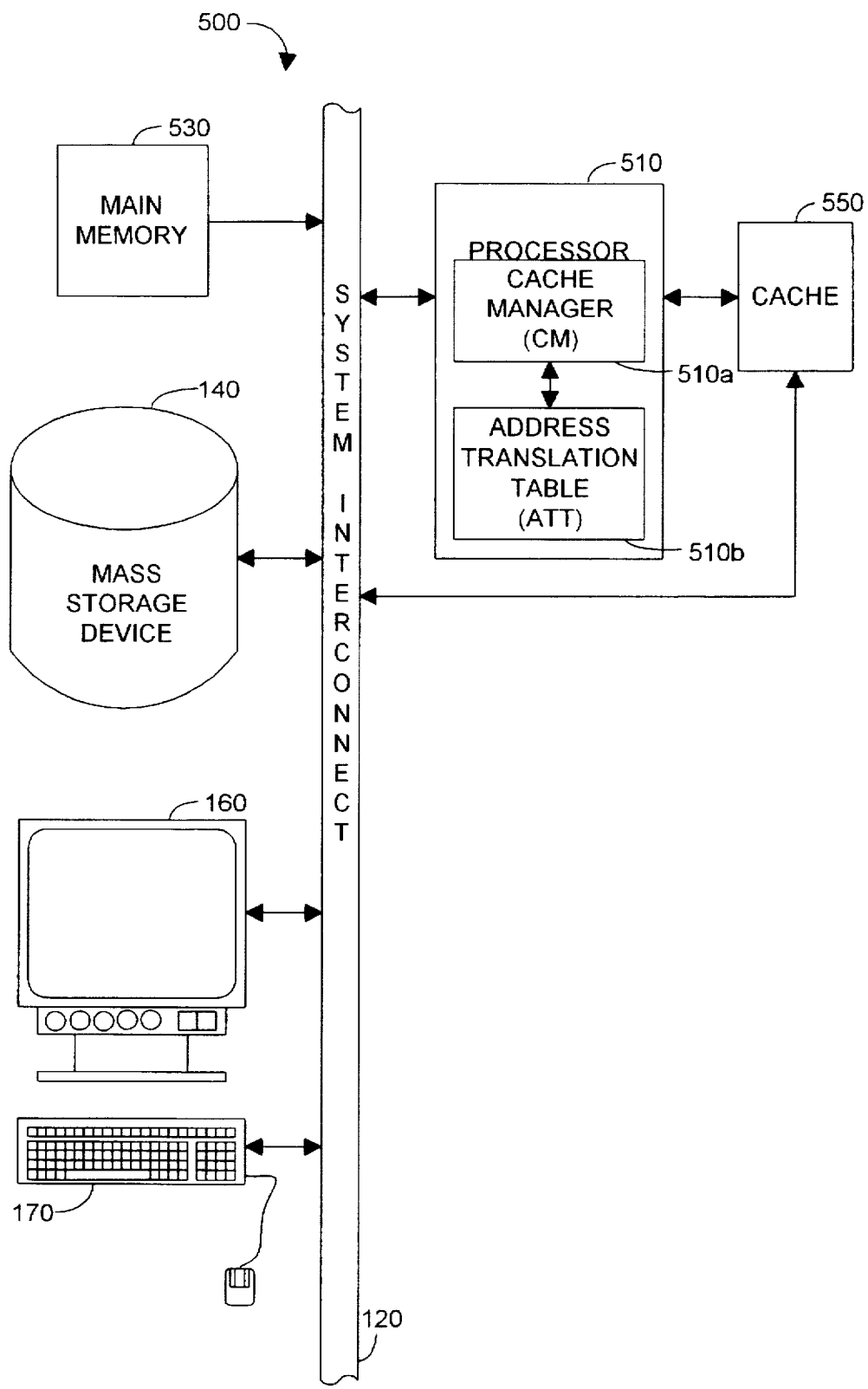
FIGS. 5 and 6 are block diagrams of a uni-processor computer system and a multi-processor computer system of the present invention.
Figure 6:
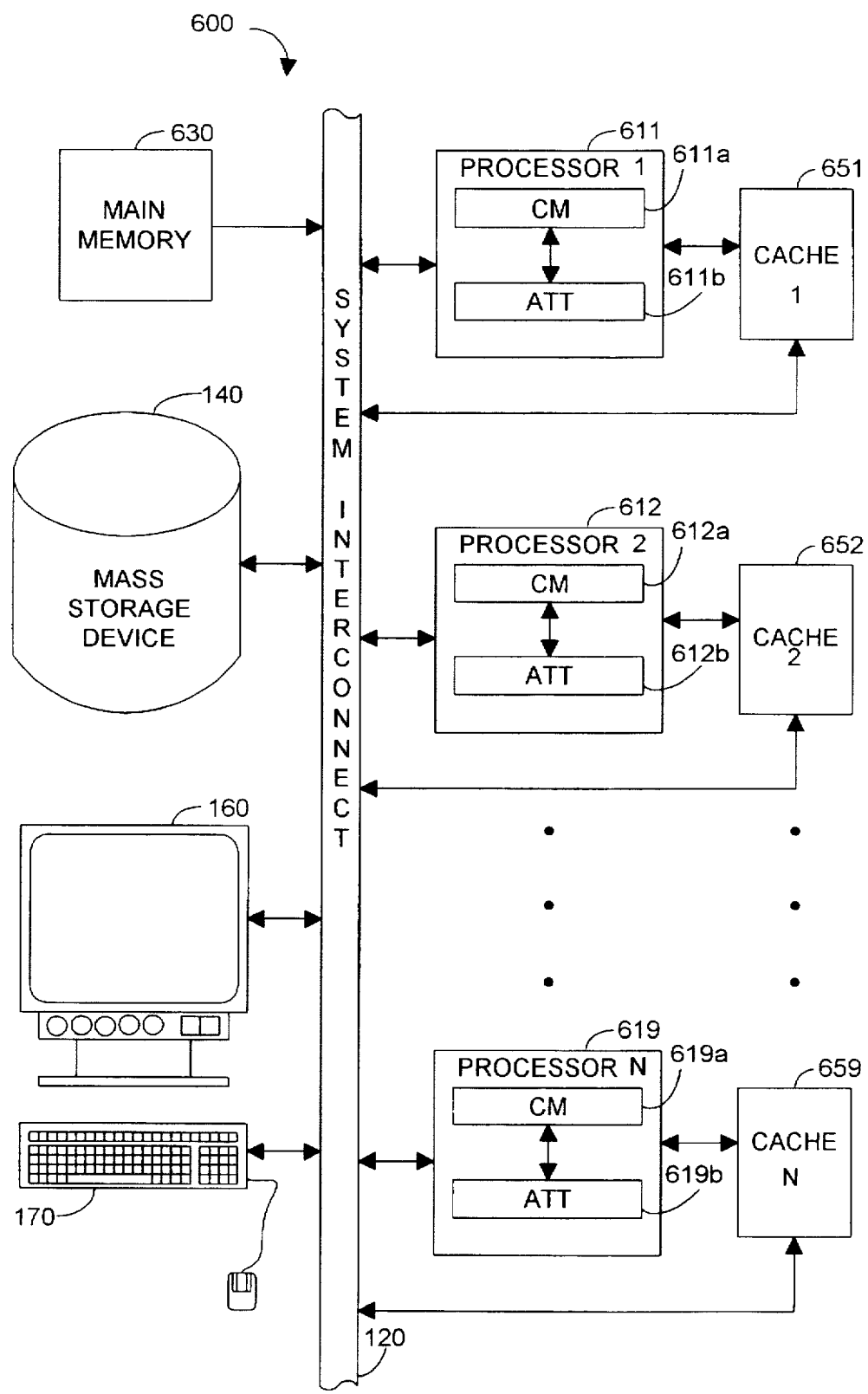

Although the present invention is useful in association with both uni-processor system 500 and multi-processor system 600 of FIGS. 5 and 6, respectively, for the purpose of this discussion, the ATT is illustrated in association with uni-processor system 500. Computer systems 500, 600 include main memory 510, 610, respectively, a system interconnect 120, a main memory 130, a mass storage device 140, a monitor 160 and a keyboard/mouse 170.

In accordance with the invention, systems 500, 600 also include cache manager (CM) 510a and CMs 611a, 612a, . . . . 619a, respectively, for use with the respective ATTs 510b and 611b, 612b, . . . 619b. In this example, main memory 530 is logically divided into 8K-byte pages. Virtual addresses include a 51-bit index portion for indexing into a boundary of a selected page, and a 13-bit offset portion for access a target byte within the selected page. Similarly, physical addresses include a 31-bit page index portion and a 13-bit page offset portion.

Structure of Tagging Table and Cache

Figure 7:
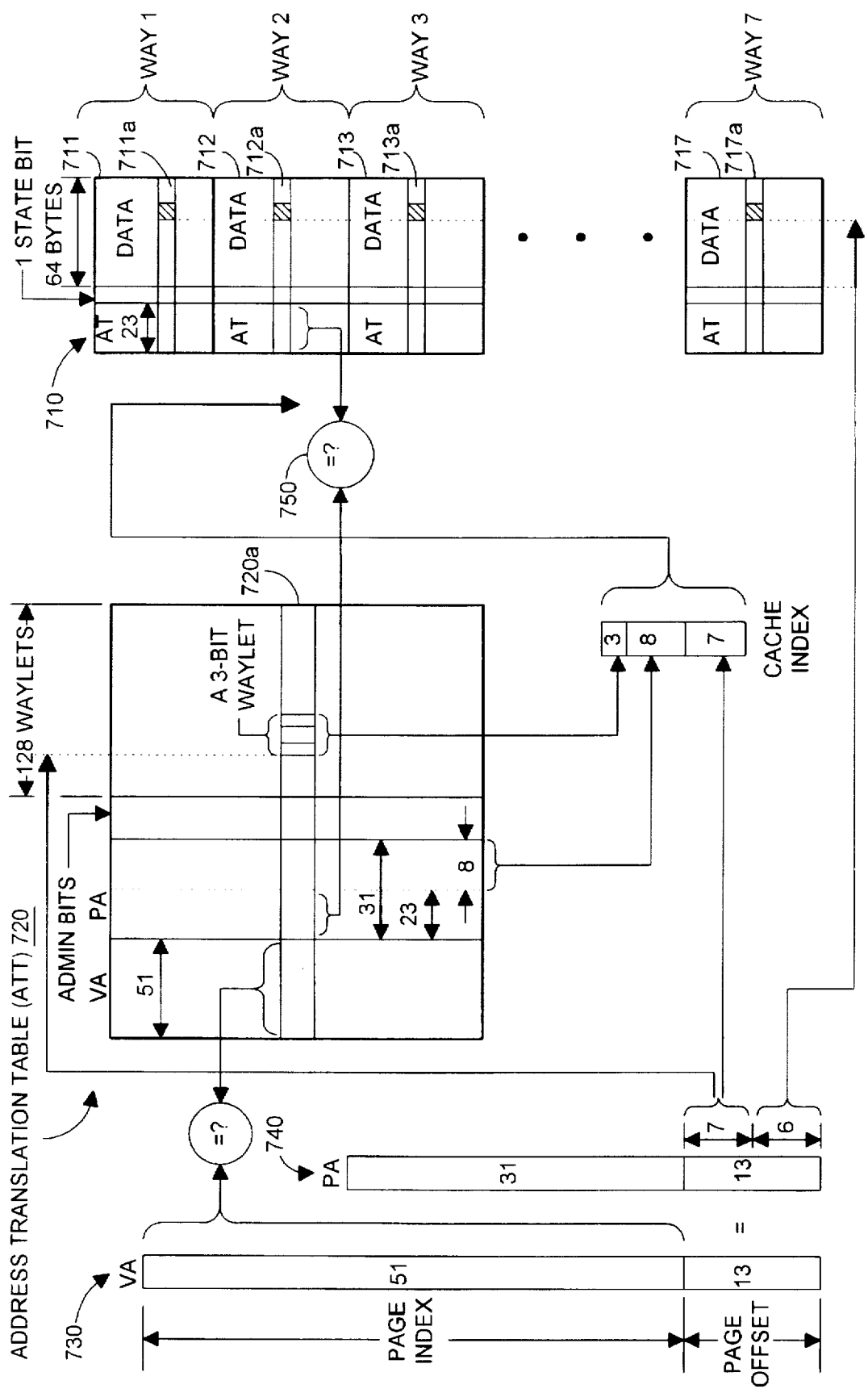
FIG. 7 is a block diagram illustrating one embodiment of a compact address translation table (ATT) suitable for incorporating in the processors of FIGS. 5 and 6, for accessing a multi-way cache.

FIG. 7 shows an exemplary compact address translation table (ATT) 720, a virtual address (VA) 730 and a physical address (PA) 740 for efficiently accessing a seven-way cache 710. ATT 720 and cache 710 are representative of ATT 510b and cache 550, respectively.

In accordance with the present invention, instead of discarding useful way information available when a cache line is first stored in cache 710, the way information is stored in ATT 720 for later use. In this implementation, "waylets" of ATT 720 provide an efficiency mechanism for storing the way information. Accordingly, each of the 512 entries of ATT 720, e.g., entry 720a, includes an identifier field, e.g., a VA field and a PA field, and two or more waylets. Since main memory 530 and ATT 720 are page-oriented while cache 710 is organized using cache lines, the number of waylets in each ATT entry corresponds to the ratio of cache lines to a memory page. In this example, each entry of ATT 720 includes 128 waylets. Note that the waylets may be stored in either the same RAM structure as the VA and PA fields or in a separate RAM structure.

The number of bits in each waylet is dependent on the number of "ways". One waylet value is reserved for an invalid value. Hence, the minimum number of way bit(s) is equal to the log2 of the number of way(s) plus one ($\log_2$ (way+1)). In this example, three-bit waylets are used to support seven-way cache 710.

Cache 710 is a seven-way associative cache divided into seven two-megabyte way-oriented segments 711, 712, . . . 717. Each segment includes 32K cache lines, each cache line being 64 bytes long. In order to rapidly access cache 710, CM 510a can be fabricated as part of processor 510 as shown in FIG. 5. Further, ATT 720 is compact in size and can also be incorporated as ATT 510b in the processor IC.

Accessing data from Cache using Tagging Table

Figure 8A:
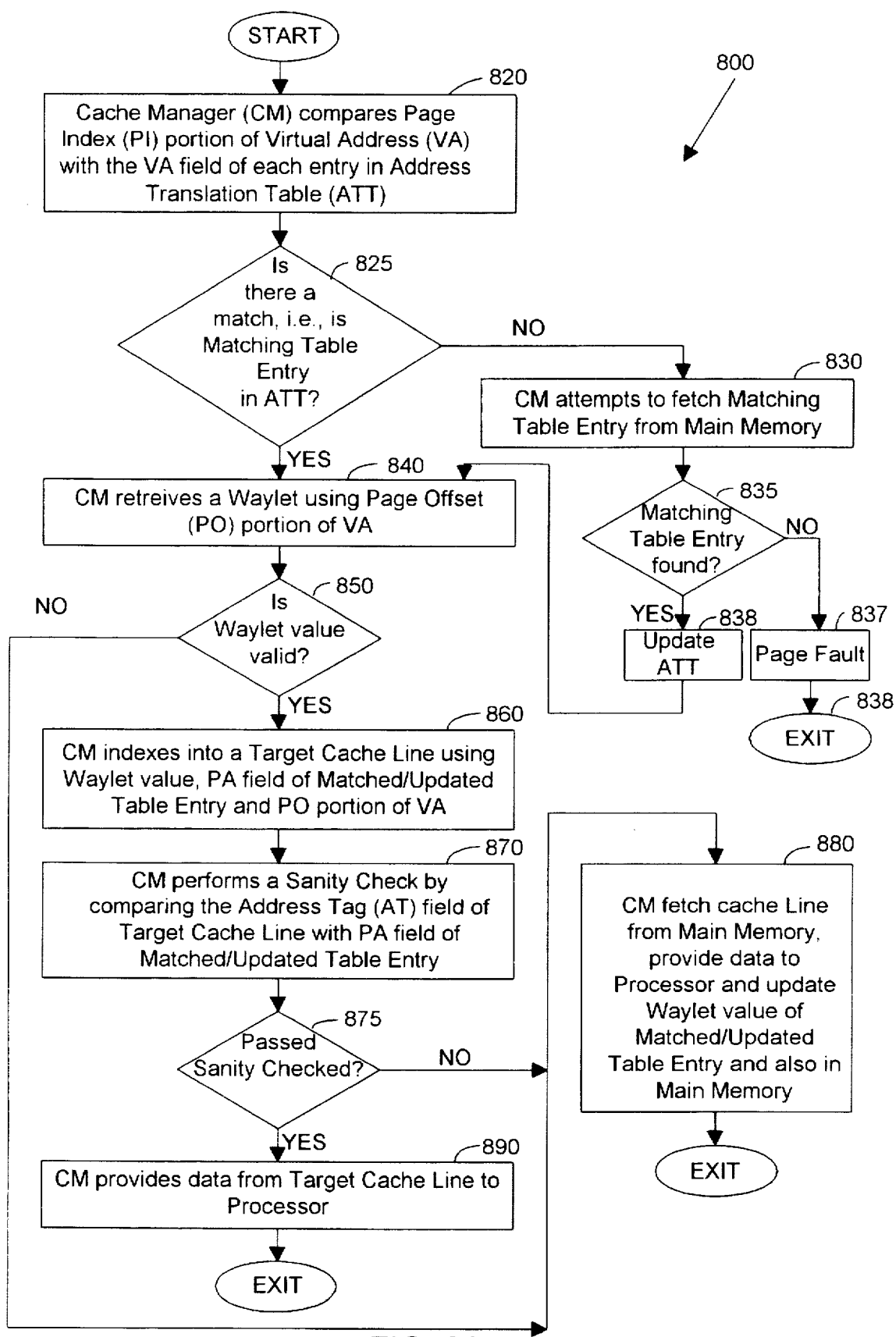
FIG. 8A, 8B and 8C are flowcharts illustrating a method for accessing a multi-way cache using the ATT of FIG. 7.

Referring now to the flowchart of FIG. 8A, when processor 510 needs to access a location in main memory 530, an initial search of cache 710 is attempted. First, CM 510a compares the page index portion of virtual address (VA) 730 with the VA field of each entry in ATT 720 (step 820).

If there is match in ATT 720 (step 825), e.g., matching ATT entry 720a, then CM 510a retrieves a waylet from entry 720a using the page offset portion of VA 730 (step 840). The waylet value is then tested for validity (step 850). In this example, valid binary bit values for waylets are "000b", "001b", . . . "110b", corresponding to first segment 711, second segment 712, and seventh segment 717 of cache 710, respectively. The waylet value "111b" is invalid and indicates a cache (line) miss. Cache misses are handled in a manner described below in step 880.

If the waylet value is valid, CM 510a indexes into a target cache line, e.g. line 712a, using the waylet value, the PA field of ATT entry 720a, and the page offset portion of VA 730 (step 860). Next, a "sanity" check is executed by comparing the address tag (AT) field of the target cache line with the PA field of ATT entry 720a (step 870). Meanwhile, CM 510a may optionally speculatively fetch the data field of target cache line 712a from cache 710 in anticipation of a cache hit. Note that the sanity check is only done with the AT field of a single cache line 712a, regardless of the number of segments in cache 710 (step 875).

Upon passing the sanity check, i.e., a cache (line) hit, the speculatively fetched data field of target cache line 712a is provided to requesting processor 510 (step 890). If the sanity check fails, i.e., a cache miss, then a new target cache line has to be retrieved from main memory 530 as described below (see step 880 described in detail below).

Conversely, if a matching ATT entry does not exist in ATT 720 (step 825), an attempt is made to fetch a matching ATT entry from main memory 530 (step 830). In the event that a matching ATT entry is found in main memory 530 (step 835), ATT 720 is updated (see step 838 described in detail below). Next, CM 510a executes step 840 through step 880 as described above.

Returning to test 835, if a matching ATT entry cannot be located in main memory 530, i.e., a page fault, a new ATT entry can be created for table 720 in the manner described below (see step 837 described in detail below).

Updating an entry of Address Translation Table (ATT) (Step 838)

Figure 8B:
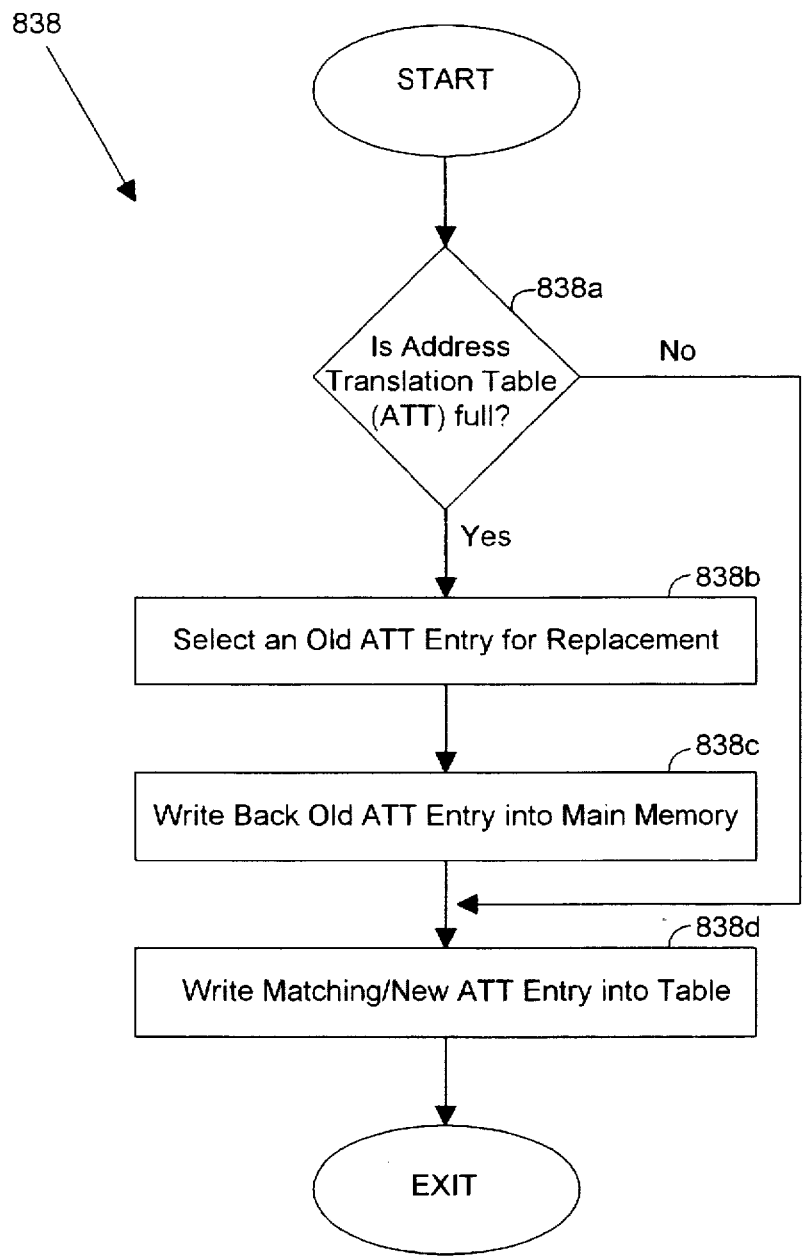

FIG. 8B is a detailed flowchart illustrating the process of updating an entry in ATT 720. First, CM 510a scans ATT 720 in search of a free ATT entry (step 638a). If ATT 720 is full, an old (existing) ATT entry is selected for replacement (step 838b). A number of well-known algorithms may be used to select the old ATT entry, e.g., least recently used (LRU). The selected old ATT entry is then written back into main memory 530 (step 838c).

In either case (test 838a), the matching or new ATT entry is written to ATT 720 (step (838d).

Note that the old ATT entry may temporarily retained by CM 510a just in case a "dirty" cache line needs to be written back into main memory 530. A cache line is "dirty" when its content is different from the parent copy in main memory 530. However, in this implementation, for efficiency, cache line(s) associated with the old ATT entry are not written back to main memory 530, unless the cache line(s) are both "dirty" and are subsequently purged from cache 710.

Replacement of a Cache Line after a Cache (Line) Miss (Step 880)

Figure 8C:
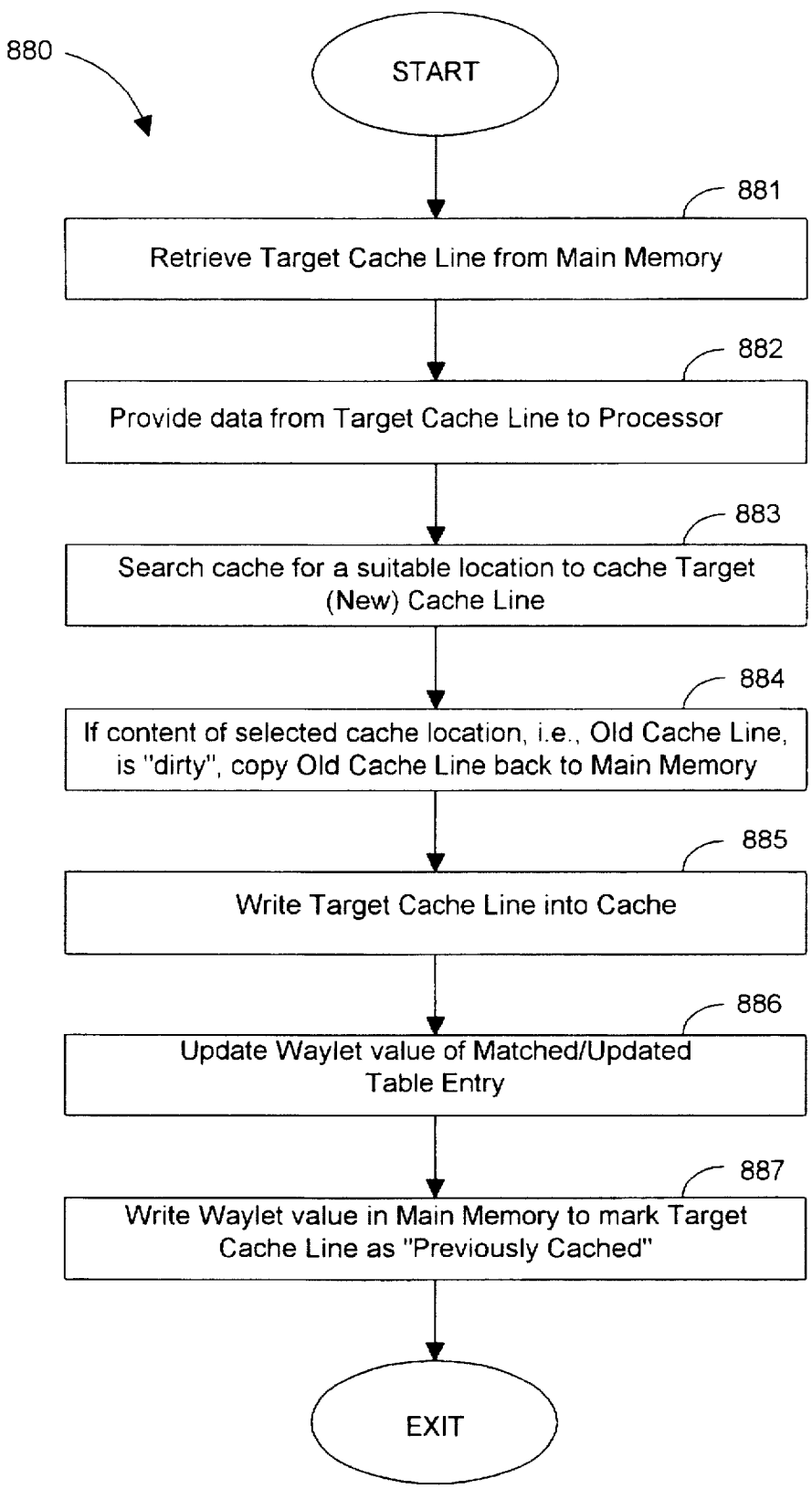

FIG. 8C is a detailed flowchart illustrating a replacement of a cache line in cache 710. When the target cache line is not found in cache 710, i.e. a cache miss, the target cache line has to be retrieved from main memory 530 (step 881). Since the data field of the retrieved (new) target cache line can be provided to processor 510 quickly (step 882), caching of the new target cache line into cache 710 can be completed off the critical path with respect to processor 110.

CM 510a searches for a suitable location in cache 710 from seven possible cache lines corresponding to the seven segments 711, 712, . . . 717 for caching the target (new) cache line (step 883). In this implementation, the suitable cache location is selected for replacement by using one of a number of well-known algorithms, e.g., LRU. If the content of the selected cache line, i.e., the old cache line, is "dirty", e.g., when the "state" bit is set, then the old cache line has to be copied back into main memory 530 using the PA field of ATT 720 (step 884).

The target (new) cache line can now be stored in the selected cache line location (step 885).

Next, the waylet value of the matched/updated ATT entry is updated (step 886). In addition, the same waylet value is stored in main memory 530 to mark the target cache line as "previously cached" (step 887).

Storing the waylet value in main memory 530 to mark a previously-cached cache line prevents an "aliasing" problem. The aliasing problem occurs when CM 510a attempts to cache a second cache line having a different VA but an identical PA. In such a situation, both ATT entries should contain the same waylet value corresponding to the common cache line. Hence, by storing the waylet value in main memory 530 each time a cache line is cached, later, when CM 510a attempts to reach the same cache line (i.e., same PA but different VA), CM 510a is able to assign the same waylet value to the second ATT entry, so that both ATT entries can index into the single copy of the cached line in cache 710.

In another embodiment, instead of storing waylets in main memory 530, each time an ATT entry is loaded into ATT 720, all the corresponding waylets are invalidated. Subsequently, cache line misses will occur and the waylets will be updated. This will eliminate the need to store the waylet information in main memory 530 when an ATT entry is replaced.

In yet another embodiment, in addition to the "waylet invalid" state, states such as "shared" are stored with each waylet in ATT 720. A shared cache line can only be read by CM 510a and hence are never "dirty". Thus, duplicate shared cache lines do not cause the aliasing problem. Subsequently, when the need to write to shared cache line arises, CM 510a must first be scanned to eliminate (invalidate) duplicate copies of the target cache line before writing over the (sole) remaining shared cache line and changing its state from shared to dirty.

In yet another embodiment, the way information is not stored in the main memory 530. Instead, on a cache miss, the aliasing problem is avoided by comparing the AT field of all seven ways with the requested address, to find out if the requested cache line already exists in cache 710. These comparisons, can be done in parallel with the memory access. The scheme is more effective than prior art because the multi-way comparison is only needed when the waylet information is not available from ATT 720.

Page Fault (step 837)

A page fault occurs when a matching table entry cannot be located in main memory 530, and a new ATT entry, e.g., entry 720a, can be created in ATT 720. Subsequently, ATT 720 is updated as in step 838 described above. The target cache line is then retrieved from main memory 530, the data provided to processor 510, and the corresponding waylet of ATT entry 720a is updated as in step 880 described above. In the event that the target page is not found in main memory 530, the target page is first retrieved from mass storage device 140 and stored in main memory 530.

Advantages of using Waylets

Waylets of the present invention offers a number of advantages over the prior art.

These waylets form an efficient and compact depository for way information of cache 710, enabling ATT 720 to be fabricated as part of the processor 510 without substantially increasing the size of the processor IC while increasing the access speed of cache 710.

In addition, the second level of comparisons of AT values is also greatly simplified. Since the waylets provides a direct index into a single target cache line of a single segment, e.g., segment 712, of cache 710, only a single comparison of the AT value of the cache line, i.e., a single sanity check, needs to be done, regardless of the number of segments in exemplary cache 710. Further, pre-fetching of the data portion of the target cache line is now possible, further streamlining the retrieval process and increasing the cache access speed substantially.

Scope of the invention

While the invention has been described with reference to specific embodiments, numerous additions and modifications are possible without departing from the spirit of the invention. For example, the number of ways may be larger or smaller. In addition, the cache line size and the page size may also be smaller or larger. Hence, the scope of the invention should be determined by the following claims.

What is claimed is:

1. A method of accessing a multi-way cache associated with a computer system having a processor and a main memory, the method comprising the steps of:

receiving a virtual address of a target cache line, the virtual address of said target cache line having a page index portion and a page offset portion;

matching a virtual address field of an address translation table (ATT) entry with said page index portion;

retrieving a waylet of said ATT entry using the page offset portion;

indexing into a single cache line of said multi-way cache using said waylet, a physical address field of said ATT entry and said page offset portion;

matching an address tag (AT) field of said single cache line with said physical address field; and retrieving a data field of said single cache line using said page offset portion.

2. The method of claim 1 wherein said step of matching the virtual address field includes the step of:

retrieving the content of said ATT entry from the main memory;

selecting an old ATT entry for write-back to the main memory; and writing back said selected old ATT entry to the main memory.

3. The method of claim 1 wherein said step of matching said AT field includes the steps of:

retrieving the content of said single cache line from the main memory and updating said waylet;

selecting an old cache line of the multi-way cache for write-back to the main memory; and writing back said selected old cache line to the main memory.

4. A method of tagging a multi-way cache useful in association with a computer system having a processor and a main memory, said method comprising the steps of:

storing an identifier associated with at least one cache line of said multi-way cache; and associatively storing way information of said one cache line, said way information identifying a particular way within said multi-way cache in which said cache line is stored.

5. The method of claim 4 wherein said way information is a waylet, and a cache line address and said waylet are stored in an address translation table (ATT) entry.

6. The method of claim 5 wherein said step of storing said identifier of said one cache line includes the steps of:

storing a page index portion of said virtual address of said one cache line in a virtual address field of said ATT entry; and associatively storing a page index portion of said physical address of said one cache line in a physical address field of said ATT entry.

7. A method of tagging a multi-way cache useful in association with a computer system having a processor and a main memory, said method comprising the steps of:

storing an identifier associated with at least one cache line of said multi-way cache wherein said step of storing said identifier of said one cache line includes the steps of:

storing a page index portion of a virtual address of said one cache line in a virtual address field of said ATT entry; and associatively storing a page index portion of a physical address of said one cache line in a physical address field of said ATT entry;

associatively storing way information of said one cache line, wherein said way information is a waylet, and a corresponding cache line address and said waylet are stored in an address translation table (ATT) entry;

receiving a virtual address of a target cache line, the virtual address of said target cache line having a page index portion and a page offset portion;

matching said virtual address field of said ATT entry with said page index portion; and retrieving said waylet from said ATT entry using the page offset portion.

8. The method of claim 7 further comprising the step of indexing into said one cache line using said waylet, the physical address field of said ATT entry and said page offset portion.

9. The method of claim 8 further comprising the steps of:

matching an address tag (AT) field of said one cache line with a portion of said physical address field of said ATT entry;

retrieving a data field of said one cache line using said page offset portion; and providing said data field to said processor.

10. The method of claim 7 wherein said step of matching the virtual address field of said ATT entry includes the step of:

retrieving the content of said ATT entry from the main memory;

selecting an old entry for write-back to the main memory; and writing back said selected old entry to the main memory.

11. The method of claim 9 wherein said step of matching said AT field includes the steps of:

retrieving the content of said one cache line from the main memory and updating said waylet;

selecting an old cache line of the multi-way cache for write-back to the main memory; and writing back said selected old cache line to the main memory.

12. A method of retrieving a cache line from a multi-way cache useful in association with a computer system having a processor and a main memory, said method comprising the steps of:

receiving an address of a target cache line, the address of said target cache line having a page index portion and a page offset portion;

matching a first address field of a tagging table entry with said page index portion; and retrieving way information from said tagging table entry using the page offset portion.

13. The method of claim 12 wherein said tagging table entry is an address translation table (ATT) entry, said way information is a waylet, said address of said target cache line is a virtual address, and said first address field of said ATT entry is a virtual address field.

14. The method of claim 13 further comprising the step of indexing into said cache line using said waylet, the physical address field of said ATT entry and said page offset portion.

15. The method of claim 14 further comprising the steps of:

matching an address tag (AT) field of said cache line with a portion of said physical address field of said ATT entry;

retrieving a data field of said cache line using said page offset portion; and providing said data field to said processor.

16. The method of claim 13 wherein said step of matching the virtual address field of said ATT entry includes the step of:

retrieving the content of said ATT entry from the main memory;

selecting an old entry for write-back to the main memory; and writing back said selected old entry to the main memory.

17. The method of claim 15 wherein said step of matching said AT field includes the steps of:

retrieving the content of said cache line from the main memory and updating said waylet;

selecting an old cache line of the multi-way cache for write-back to the main memory; and writing back said selected old cache line to the main memory.

18. A tagging table for accessing a multi-way cache associated with a computer system having a processor and a main memory, said cache having a plurality of cache lines divided into two or more segments corresponding to the number of ways of said multi-way cache, wherein said tagging table comprises:

a plurality of entries, each table entry including:

an identifier field; and a way information field associatively coupled to said identifier field, for indexing to one of said segments wherein said one of said segments is storing a cache line identified by said table entry.

19. The tagging table of claim 18 wherein said tagging table is an address translation table (ATT), said way information field includes a waylet, and said identifier field of said ATT entry includes a virtual address field and a physical address field.

20. The tagging table of claim 18 wherein said tagging table is incorporated with said processor on an integrated circuit.

21. A computer-readable memory that can be used to direct a processor to control execution of a procedure having a sequence of steps for accessing a multi-way cache, said computer-readable memory comprising:

a tagging table having a plurality of entries, each entry including an identifier field and a way information field; and a cache manager (CM) configured to:

receive an address of a target cache line, the address of said target cache line having a page index portion and a page offset portion;

match the identifier field of one said entry of the tagging table with said page index portion; and retrieve the way information field of said one entry using the page offset portion.

22. The computer-readable memory of claim 21 wherein said tagging table is an address translation table (ATT), said way information field is a waylet, said address of said target cache line is a virtual address, and said identifier field of said one entry includes a virtual address field and a physical address field.

23. The computer-readable memory of claim 22 wherein said cache manager is further configured to index into a cache line of said multi-way cache using said waylet, said physical address field of said one entry and said page offset portion.

24. The computer-readable memory of claim 23 wherein said cache manager is further configured to:

match an address tag (AT) field of said cache line with a portion of said physical address field of said one entry;

retrieve a data field of said cache line using said page offset portion; and provide said data field to said processor.

25. A computer system comprising:

a processor coupled to said multi-way cache, said processor including:

a tagging table having a plurality of entries, each entry including an identifier field and a way information field; and a cache manager (CM) configured to:

receive an address of a target cache line, the address of said target cache line having a page index portion and a page offset portion;

match the address field of one said entry of the tagging table with said page index portion; and retrieve the way information field of said one entry using the page offset portion.

a multi-way cache coupled to said processor;

a system interconnect coupled to said processor; and a main memory coupled to said system interconnect.

26. The computer system of claim 25 wherein said tagging table is an address translation table (ATT), said way information field is a waylet, said address of said target cache line is a virtual address, and said identifier field of said one entry includes a virtual address field and a physical address field.

27. The computer system of claim 26 wherein said cache manager is further configured to index into a cache line of said multi-way cache using said waylet, said physical address field of said one entry and said page offset portion.

28. The computer system of claim 27 wherein said cache manager is further configured to:

match an address tag (AT) field of said cache line with a portion of said physical address field of said one entry;

retrieve a data field of said cache line using said page offset portion; and provide said data field to said processor.

29. The computer system of claim 26 wherein said cache manager is further configured to:

retrieve the content of said one entry from the main memory;

select an old entry for write-back to the main memory; and write-back said selected old entry to the main memory.

30. The computer system of claim 28 wherein said cache manager is further configured to:

retrieve the content of said cache line from the main memory and updating said waylet;

select an old cache line of the multi-way cache for write-back to the main memory; and write-back said selected old cache line to the main memory.

* * * * *